(12) United States Patent
Kozey

(10) Patent No.: US 8,192,622 B2
(45) Date of Patent: Jun. 5, 2012

(54) STRAINER WITH BOTTOM GUARD AND COUNTERWEIGHT

(75) Inventor: Gregory Kozey, Eastford, CT (US)

(73) Assignee: Kochek Company, Inc., Putnam, CT (US)

( * ) Notice: Subject to any disclaimer, the term of this patent is extended or adjusted under 35 U.S.C. 154(b) by 8 days.

(21) Appl. No.: 12/754,646

(22) Filed: Apr. 6, 2010

(65) Prior Publication Data

US 2011/0240543 A1   Oct. 6, 2011

(51) Int. Cl.
*B01D 35/02* (2006.01)

(52) U.S. Cl. ......... 210/232; 210/460; 210/462; 210/463

(58) Field of Classification Search .................. 210/232, 210/460, 462, 463
See application file for complete search history.

(56) References Cited

U.S. PATENT DOCUMENTS

| 1,033,745 | A | * | 7/1912 | Smith ............................ 210/107 |
| 1,579,917 | A | | 4/1926 | Deming |
| 2,597,728 | A | | 5/1952 | Hink |
| 2,957,579 | A | | 10/1960 | McCombie |
| 3,109,812 | A | | 11/1963 | McAuley et al. |
| 3,206,036 | A | * | 9/1965 | Hawley ......................... 210/460 |
| 3,291,313 | A | * | 12/1966 | Davis ............................ 210/354 |
| 3,613,894 | A | * | 10/1971 | Clegg, Jr. ...................... 210/276 |
| 4,017,394 | A | | 4/1977 | Hensley |
| 4,152,264 | A | * | 5/1979 | Hanna, Sr. ............... 210/170.09 |
| 4,179,379 | A | | 12/1979 | Mitchell |
| 4,647,374 | A | | 3/1987 | Ziaylek et al. |
| 4,973,405 | A | | 11/1990 | Kozey |
| 5,820,751 | A | | 10/1998 | Faircloth, Jr. |
| 6,949,198 | B2 | * | 9/2005 | Reber ......................... 210/747.5 |
| 7,794,589 | B2 | * | 9/2010 | Kozey ........................... 210/122 |

* cited by examiner

*Primary Examiner* — Thomas M Lithgow

(74) *Attorney, Agent, or Firm* — Michaud-Kinney Group LLP

(57) ABSTRACT

A strainer assembly including a guard having a gusset extending therefrom and a strainer coupled at a first end to the gusset. The strainer extends outwardly in a longitudinal direction from the first end and is cantilevered relative thereto. The strainer includes a coupling portion mounted on a second end of the strainer.

18 Claims, 4 Drawing Sheets

STRAINER WITH BOTTOM GUARD AND COUNTERWEIGHT

FIELD OF THE INVENTION

This invention relates to a strainer of the type employed for drawing a fluid from an open body of the fluid, such as drawing water from a pond, lake, stream, river, etc. and more specifically to such a strainer having a bottom guard and counterweight.

BACKGROUND

It is sometimes necessary to pump water from an open body of water such as a pond, a lake, a stream, etc., for purposes of firefighting, irrigation, etc., by drawing the water through a hose that has an intake end in the body of water. Such bodies of water often contain debris, such as leaves, twigs, fish, etc., that interfere with the operation of the pump or that are simply unwanted in the water being pumped. It is known to provide a strainer on the intake end of the hose to prevent debris from entering the hose. To reduce the introduction of silt or other unwanted matter from the bottom of the body of water, the intake end of the hose can be attached to a suction head assembly that includes the strainer and a float to keep the intake end of the hose near the water surface. However, the floats are typically large and heavy.

SUMMARY OF THE INVENTION

The present invention resides in one aspect in a strainer assembly that includes a guard having a gusset member extending therefrom. A strainer is coupled at a first end to the gusset member and extends longitudinally therefrom and is cantilevered relative thereto. The strainer also includes a coupling portion mounted on a second end of the strainer generally opposite the first end.

According to other aspects disclosed herein, the strainer assembly includes a counterweight, that during use, causes the strainer assembly to sink in an attitude such that the guard is positioned below the strainer.

In another aspect of the present invention, the strainer is rotatable relative to the gusset member, about a longitudinal central axis defined by the strainer.

DETAILED DESCRIPTION OF THE INVENTION

Figure 1:
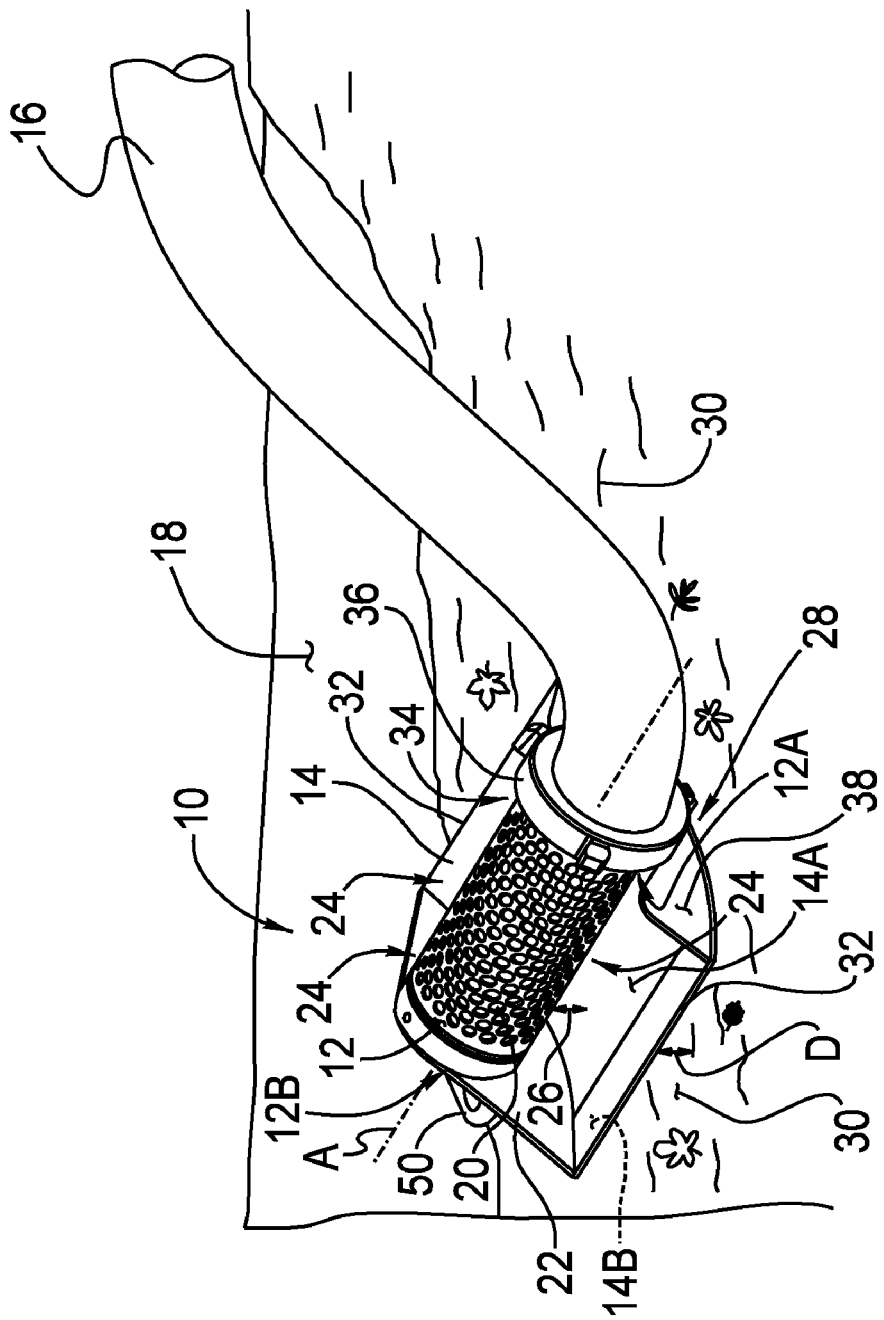
FIG. 1 is a perspective view of the strainer assembly in use, the strainer assembly being configured according to an embodiment of the present invention.
Figure 2:
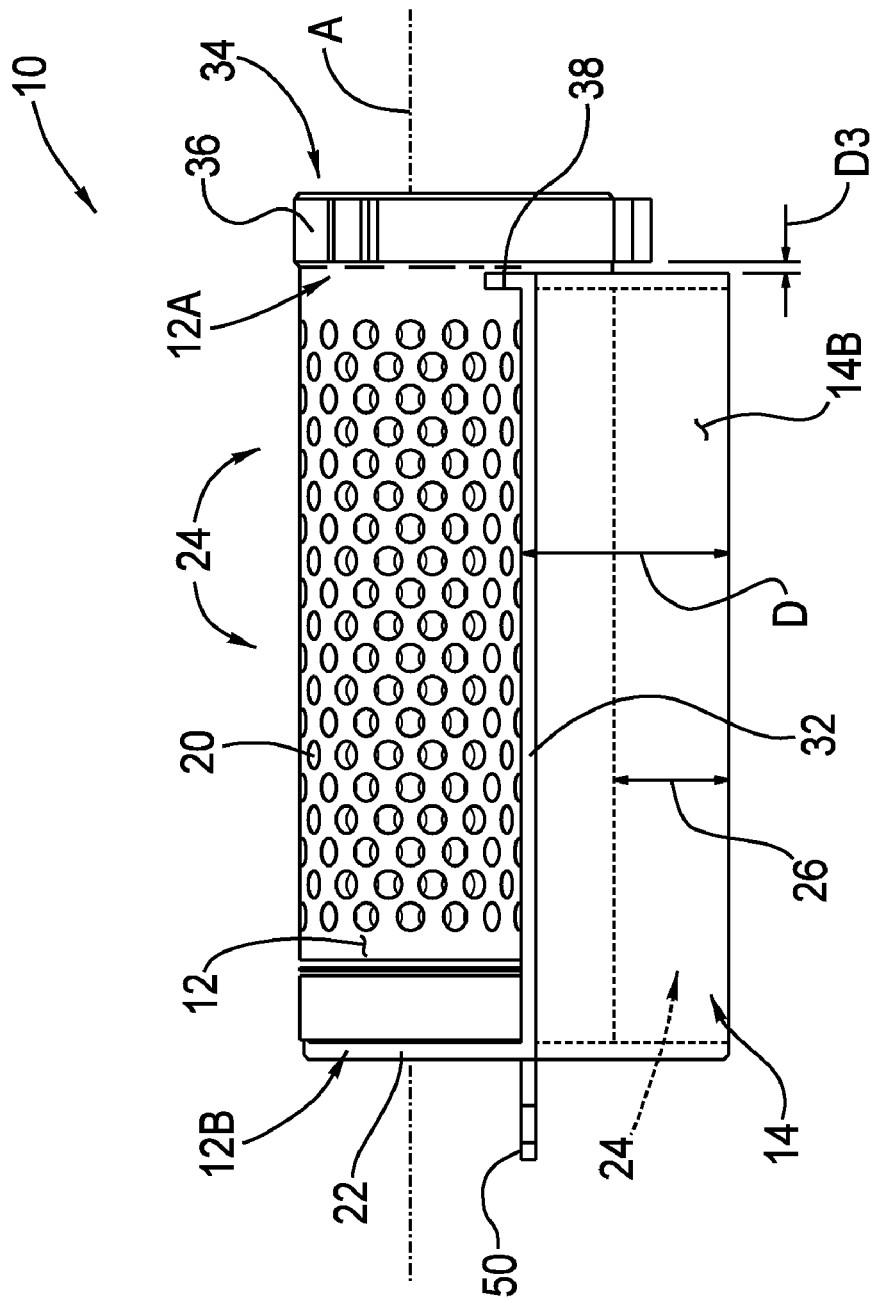
FIG. 2 is a side view of the strainer assembly of FIG. 1.

As shown in FIGS. 1 and 2, the strainer assembly, generally designated by the numeral 10, comprises a strainer 12 having a guard 14 secured thereto. During use, when the strainer assembly 10 is submerged in a body of water or other fluid 18, the guard 14 functions as a base to maintain the strainer assembly in an attitude that minimizes the potential for the strainer to come into contact with a bottom surface 30 of the fluid 18. As shown in the illustrated embodiment, the strainer 12 is coupled to a hose 16. During use, the strainer is submerged in a fluid 18, such as, but not limited to water. The fluid 18 is drawn through the strainer 12 and into the hose 16 for such things as firefighting and irrigation.

Referring to FIGS. 1 and 2, the strainer 12 has a generally cylindrical configuration and includes a plurality of perforations 20 around a substantial portion of the circumference of the strainer. The perforations 20 are sized small enough to block the passage of debris, such as leaves, sticks and rocks, yet allow the passage of water therethrough. A fixed end 12B of the strainer 12 is secured to a gusset member 22 such that the strainer extends longitudinally in a cantilevered configuration relative to the gusset member. The gusset member 22 is secured to the guard 14 such that the guard is spaced from the strainer 12, defining a gap 26 therebetween. A suction area 24 through which the fluid 18 is drawn into the strainer 12 is defined by the gap 26 and areas adjacent to the strainer, such as those above and to the sides of the strainer.

In the illustrated embodiment, the gusset member 22 is shown as a solid plate, however the present invention is not limited in this regard as other configurations can also be employed including but not limited to the gusset member 22 including perforations and/or slots extending therethrough. In the illustrated embodiment, the guard 14 defines a concave surface 14A, however the present invention is not limited in this regard as other contours, such as a flat surface can also be employed without departing from the broader aspects of the invention.

Moreover, while the strainer is shown and described as being generally cylindrical, the present invention is not limited in this regard as other configurations including those with square, oval, rectangular and triangular cross sections may also be employed without departing from the broader aspects disclosed herein.

The strainer 12, the guard 14 and/or the gusset member 22 are non-buoyant bodies of a density sufficient to cause the strainer assembly 10 to sink in the fluid 18. Moreover, the guard 14 acts as a counterweight that causes the strainer assembly 10 to sink in an upright position as illustrated, with the base portion 28 positioned below the strainer, in the fluid 18 such that portions of the guard 14 settle onto and engage a bottom surface 30 of the fluid 18, with the strainer 12 spaced from the bottom surface 30. When settled into position on the bottom surface 30, the guard 14 provides a base to maintain the strainer assembly in the upright position. The guard 14 also provides a barrier between the bottom surface 30 and the strainer 12 to block the debris located beneath the guard from entering the suction area 24. Opposing edge portions 32 of the guard 14 curve away from and are spaced from the bottom surface 30 by a distance D, to obstruct debris from migrating into the suction area 24.

While the guard 14 acts as a counterweight, the present invention is not limited in this regard, as other weights or ballast can be employed and secured to the strainer assembly to ensure it remains in an upright position when installed in the fluid 18.

In addition, the gusset member 22 covers the fixed end 12B of the strainer 12 and an end portion of the gap 26 coplanar with the fixed end 12B, to block debris from entering the strainer 12 through the fixed end 12B and the end portion of the gap. The gusset member 22, also includes a lug 50 secured thereto for connecting a rope, or the like, to the lug, to retrieve the strainer assembly 10 from the fluid 18.

While the lug 50 is described and illustrated as being secured to the gusset member, the present invention is not limited in this regard, as one or more connectors and/or lugs can be employed and secured to other portions of the strainer assembly 10, including but not limited to the guard 14, the edge portions 32 of the guard 14, and/or the strainer 12, for attaching a rope or the like thereto for retrieving the strainer assembly from the fluid 18.

Figure 3:
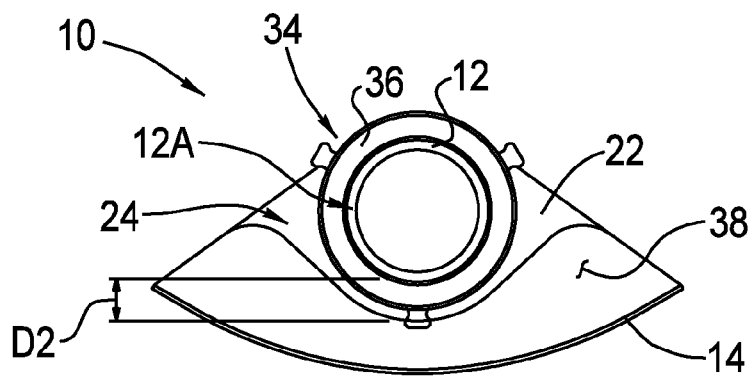
FIG. 3 is a front view of the strainer assembly of FIG. 1.

As illustrated in FIGS. 1-3, the strainer 12 includes a coupling portion 34 for receiving and coupling the hose 16 to the strainer 12. The coupling portion 34 defines a bore extending therethrough, the bore being substantially coaxial with the longitudinal axis A. The coupling portion 34 may include a coupler 36 for joining the hose 16 to the strainer 12. The coupler is adapted to matingly engage another coupling portion attached to an end of the hose 16. The coupler 36 optionally may be any standard hose coupler such as a Storz coupler, a NST coupler, a barb shank, etc., for a standard fire hose, a garden hose, etc.

Referring to FIGS. 1-3, a baffle plate 38 is secured to the guard 14 opposite the gusset member 22 adjacent to and spaced apart from the free end 12A of the strainer 12 by a distance D2. The baffle plate 38 obstructs the flow of debris into the suction area 24 while allowing water to flow over the baffle plate into the suction area. In addition, as illustrated in FIG. 2, the baffle plate 38 is spaced apart from the coupler 36 by a distance D3 so that the coupler may freely rotate relative to the strainer 12. In one embodiment, the baffle plate 38 includes perforations extending therethrough.

Figure 4:
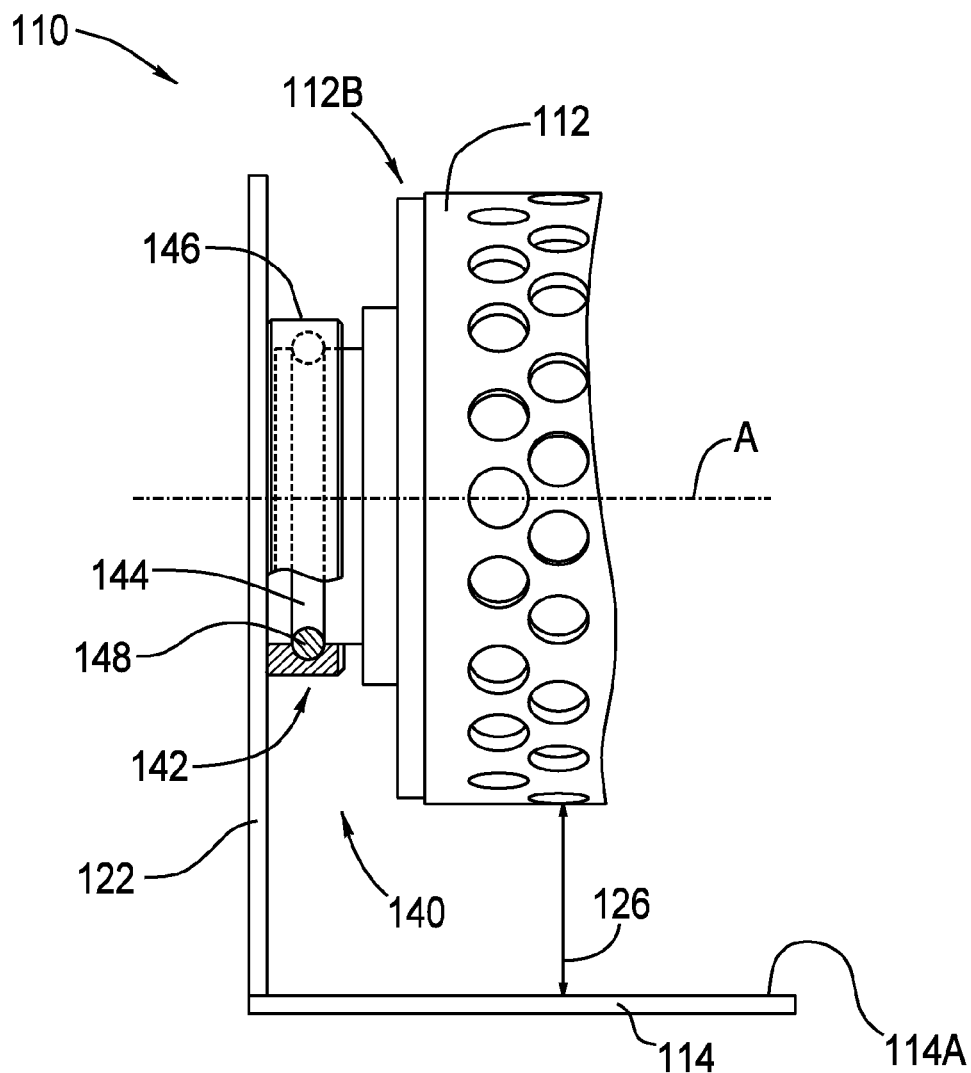
FIG. 4 is a partial side view of the strainer assembly in accordance with an embodiment of the present invention.

The strainer assembly of FIG. 4 is similar to that of FIG. 1, accordingly like elements will be given the same reference numbers preceded by the number 1. Referring to FIG. 4, the strainer assembly 110 includes a strainer 112 coupled to a gusset member 122 via a rotatable coupling 140 comprising a bearing 142. One end 112B of the strainer 112 is rotatably secured to the gusset member 122 such that the strainer extends longitudinally extends in a cantilevered configuration relative to the gusset member. Similar to that described above for the strainer assembly 10, the guard 114 is spaced from the strainer 112, defining a gap 126 therebetween.

The bearing 142 comprises an inner race 144 and an outer race 146 that together define a raceway for a plurality of rolling elements 148 disposed between the inner race and the outer race. The outer race 146 is mounted on the gusset member 122 and the inner race 144 is formed on the end 112B of the strainer 122 opposite from the coupling portion (not shown). The bearing 142 permits the strainer 112 to rotate relative to the gusset member 122 and to the guard 114 in response to torque received via a hose connected to the strainer. The bearing 142 is situated to permit the strainer 112 to rotate about the central axis A. While FIG. 4 shows the outer race 146 secured onto the gusset member 122 and the inner race 144 formed on the strainer 112, this is not a limitation on the invention, and in other embodiments, the outer race is formed on the strainer and the inner race is on the gusset member. In still other embodiments, other rotatable couplings may be used instead of the bearing 142, such as a mounting pin, journal, bushing, etc.

Figure 5:
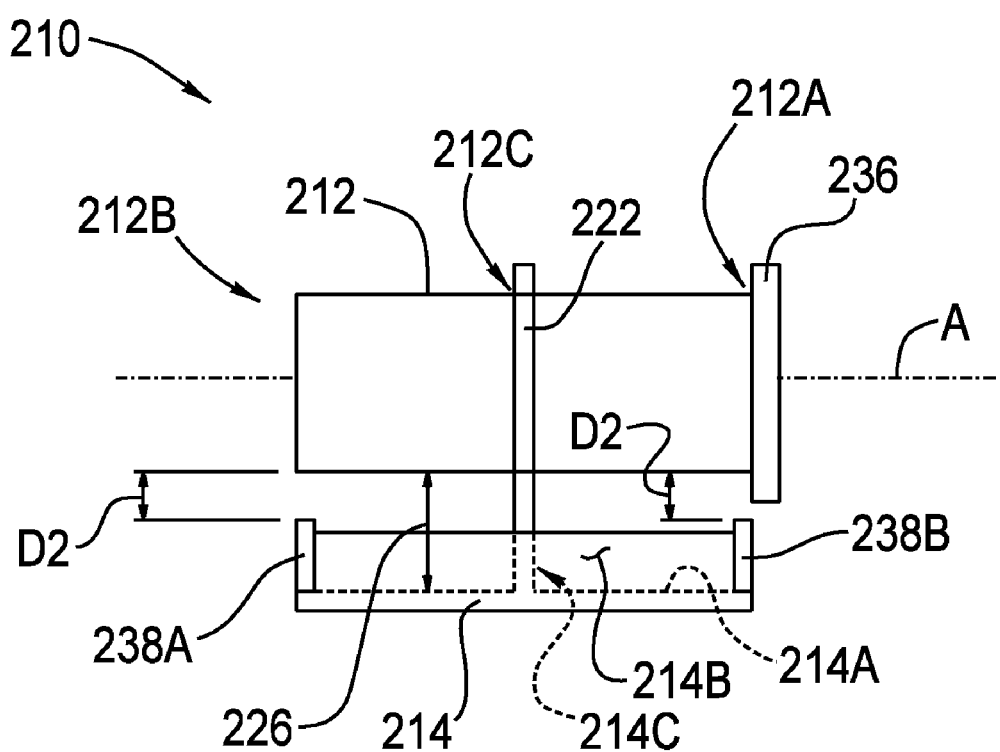
FIG. 5 is a side view of an embodiment of the strainer assembly in accordance with the present invention.

The strainer assembly of FIG. 5 is similar to that of FIG. 1, accordingly like elements will be given the same reference numbers preceded by the number 2. Referring to FIG. 5, a portion 212C of the strainer 212, disposed between opposing ends 212A and 212B of the strainer, is secured to a gusset member 222 such that each end 212A and 212B extends longitudinally from the gusset member 222 in opposite directions, in a cantilevered configuration relative to the gusset member. The gusset member 222 is secured to a portion 214C of the guard 214, disposed between opposing ends of the guard, such that a concave surface 214A of the guard is spaced apart from the strainer 212, defining a gap 226 therebetween. In addition, a baffle plate 238A and 238B is secured to each of the opposing ends of the guard 214 and spaced apart from the strainer 212 by a distance D2.

While, the strainer 212 is described as being secured to the gusset member 222, the present invention is not limited in this regard, as the strainer may include a rotatable coupling, such as a bearing (see FIG. 4, for example) for rotatably coupling the strainer to the gusset member thereby enabling rotation of the strainer about the axis A relative to the gusset member.

The terms "first," "second," and the like, herein do not denote any order, quantity, or importance, but rather are used to distinguish one element from another. In addition, the terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the spirit and scope of this invention and of the appended claims.

What is claimed is:

1. A strainer assembly comprising:
    a guard having a gusset extending therefrom;
    a strainer coupled at a first end to said gusset, said strainer extending outwardly in a longitudinal direction from said first end and being cantilevered relative thereto;
    a coupling portion mounted on a second end of said strainer;
    said gusset being rotatable relative to said strainer thereby causing said guard to be positioned below said strainer when said strainer extends longitudinally in an approximately horizontal position.

2. The strainer of claim 1, said guard being spaced apart from said strainer and extending partially therearound.

3. The strainer of claim 1, comprising a counterweight for causing said strainer assembly to sink in a fluid with said guard being positioned below said strainer.

4. The strainer of claim 3, wherein said counterweight comprises said guard.

5. The strainer of claim 1, wherein at least one of said guard, said strainer and said gusset is non-buoyant.

6. The strainer of claim 1, said coupling portion defining a bore extending therethrough, said bore being substantially coaxial with said longitudinal axis.

7. The strainer of claim 1, said coupling portion being adapted to matingly engage another coupling portion attached to an end of a hose.

8. The strainer of claim 1, wherein the strainer is coupled to the first end of the gusset by a rotatable coupling comprising a bearing.

9. The strainer of claim 8, wherein the bearing comprises an inner race and an outer race and a plurality of rolling elements are disposed between the inner race and the outer race.

10. The strainer of claim 9, wherein the outer race is mounted on the gusset and the inner race is mounted on the strainer.

11. A strainer assembly comprising:
    a concave guard having a gusset extending therefrom;
    a strainer coupled at a first end to said gusset, said strainer extending outwardly in a longitudinal direction from said first end and being cantilevered relative thereto;
    a coupling portion mounted on a second end of said strainer;
    wherein said guard comprises opposing edge portions, and wherein said edge portions extend above at least a portion of the strainer; and said strainer being rotatable relative to said gusset about a central longitudinal axis defined by said strainer.

12. The strainer of claim 11, said guard being spaced apart from said strainer and extending partially therearound.

13. The strainer of claim 11, comprising a counterweight for causing said strainer assembly to sink in a fluid with said guard being positioned below said strainer.

14. The strainer of claim 13, wherein said counterweight comprises said guard.

15. The strainer of claim 11, wherein at least one of said guard, said strainer and said gusset is non buoyant.

16. The strainer of claim 11, said coupling portion defining a bore extending therethrough, said bore being substantially coaxial with said longitudinal axis.

17. The strainer of claim 11, said coupling portion being adapted to matingly engage another coupling portion attached to an end of a hose.

18. The strainer of claim 11, wherein the strainer is coupled to the first end of the gusset by a rotatable coupling comprising a bearing.

\* \* \* \* \*